April 20, 1965 W. STAFFEL 3,179,443
PIPE FITTINGS, PARTICULARLY FOR PRESSURE WAVE
TRANSMITTERS AND THE LIKE
Filed Sept. 29, 1960 2 Sheets-Sheet 1

INVENTOR
Wilhelm Staffel
BY Michael S. Striker
his ATTORNEY

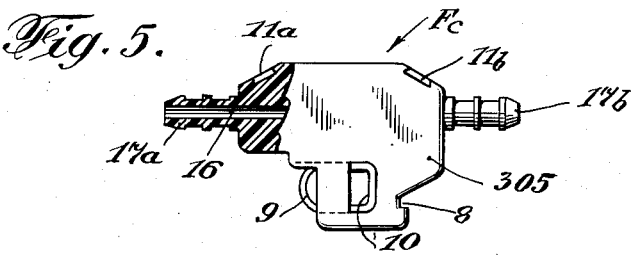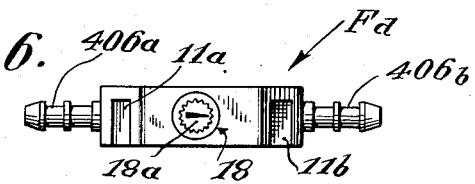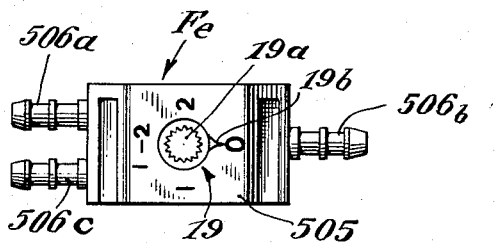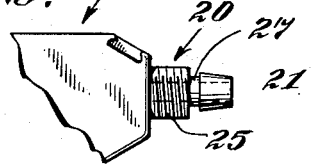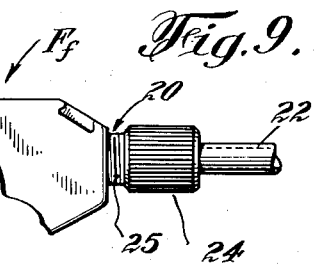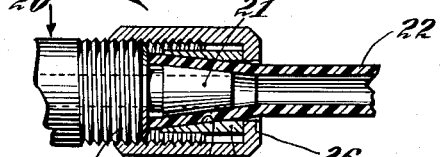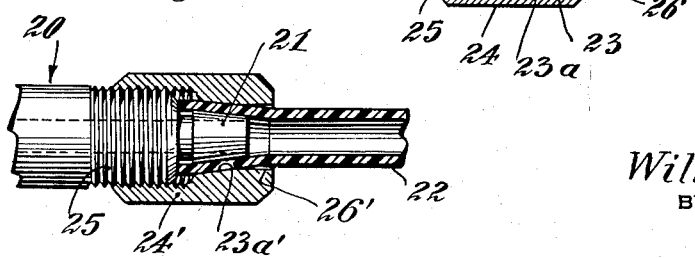

United States Patent Office 3,179,443
Patented Apr. 20, 1965

3,179,443
PIPE FITTINGS, PARTICULARLY FOR PRESSURE
WAVE TRANSMITTERS AND THE LIKE
Wilhelm Staffel, Konigswinter (Rhine), Haus Margarethe,
Germany, assignor to C. A. Weidmuller KG, Berlebeck,
near Detmold, Germany
Filed Sept. 29, 1960, Ser. No. 59,274
6 Claims. (Cl. 285—61)

The present invention relates to pipe fittings in general, and more particularly to improvements in pipe fittings which are especially suited for use in tubing forming part of so-called pressure wave transmitters adapted to operate by remote control switches, relays and other electric circuit making and breaking devices.

The use of pressure wave transmitters in the switching, control and installation arts is always advisable when a switching impulse intended to become effective at a remote point must be released in areas which are damp or filled with corrosive vapors, as well as in areas where a spark could cause explosions and/or fires. Furthermore, in many instances such pressure wave transmitters serving as impulse sensing, indicating and conveying means are simpler, more reliable and cheaper than the remote control devices of presently known design.

An important object of the present invention is to provide a very simple, rugged, reliable and compact pipe fitting or joint for use in pressure wave transmitters of the above outlined characteristics.

Another object of the invention is to provide a pipe fitting of the just described type which may be utilized as a joint between two or more tubular bodies and which may control the communication of pressures from one or more pressure transmitting pipes to one or more pressure receiving and conveying pipes.

An additional object of the instant invention is to povide a system of pipe fittings for pressure wave transmitters wherein the individual fittings may be readily recognized and distinguished from other fittings of the system so as to facilitate eventual repair, interchange or replacement of fittings.

Still another object of the invention is to provide a pipe fitting or pipe joint which is absolutely leak-proof, which may be formed as a one-piece or multi-piece body, and wherein the connecting nipples may be at least partially or even fully concealed to protect the unions with the individual pipes.

With the above objects in view, the invention resides in the provision of a pipe fitting which comprises a preferably elongated flat housing of insulating material, at least two communicating nipples mounted on or integral with the housing each of which is connectable with a pipe forming part of the pressure wave transmitting system, and means preferably provided on the base portion of the housing for releasably locking the fitting to a supporting rack.

When the pressure wave transmitting system comprises a large number of pressure wave transmitting lines, the fittings which connect the pipes forming part of the individual lines are arranged side-by-side with their flat side faces in abutment with or closely adjacent to each other, and means is preferably provided for preventing unintentional separation of the fittings from the supporting rack.

The nipples may be embedded in, releasably secured to, or integrally formed with the housing of the pipe fitting. For example, a pipe fitting may comprise two oppositely extending nipples and a two-way valve, e.g. a stopcock or the like, which is adapted to control the transmission of pressure impulses from the one to the other nipple and to the pipes connected with the nipples. Alternately, the housing of the pipe fitting may support three or more nipples and the fitting then comprises a suitable multi-way valve so that at least one nipple may be connected with or sealed from at least two additional nipples.

According to another feature of my invention, the pipe fitting may be formed with special externally threaded nipples which cooperate with internally threaded caps formed with outwardly flaring conical bores so that the conical head of a nipple and the cap may sealingly retain the end portion of a conduit therebetween to prevent any leakage at the joint. Alternately, the cap may receive a suitable sleeve which is then formed with an outwardly flaring conical bore for retention of a pipe on the nipple.

The novel features which are considered as characteristic of the invention are set forth in particular in the appended claims. The invention itself, however, both as to its construction and its method of operation, together with additional objects and advantages thereof, will be best understood from the following detailed description of certain specific embodiments when read in connection with the accompanying drawings, in which:

FIG. 5 is a partly elevational and partly sectional view of a fitting whose body is integral with the nipples;

FIG. 6 is a top plan view of a fitting which embodies a control valve;

FIG. 7 is a top plan view of a pipe fitting which is formed with three nipples and embodies a three-way valve;

FIG. 8 is an enlarged fragmentary view of a pipe fitting which is formed with a special sealing nipple;

FIG. 9 shows the nipple of FIG. 8 sealingly connected with the end of a pipe;

FIG. 10 is an enlarged axial section through the connection shown in FIG. 9; and FIG. 11 is an axial section through a connection which is slightly different from the connection shown in FIGS. 9 and 10.

Figure 1:
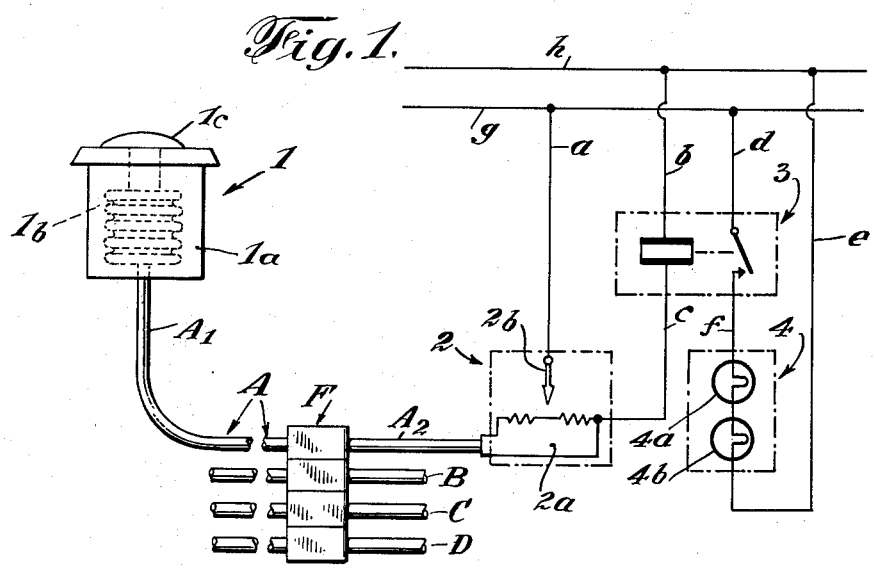
FIG. 1 is a diagrammatic view of a pressure wave transmitter and of the electric system which receives impulses from the transmitter, a series of pipe fittings embodying my invention being shown schematically in the lines or tubings which connect the pressure wave generators with the pressure wave receivers of the electric system.

Referring now in greater detail to the illustrated embodiments, and first to FIG. 1, there is shown a pressure wave sender or generator 1 which, in one of its forms, may comprise a casing 1a containing a fluid-filled diaphragm or bellows 1b engageable and deformable by an actuating element in the form of a push-button 1c in order to generate a pressure impulse and to transmit the impulse in the form of a pressure wave through a composite line or tubing A, the latter comprising at least two pipes or tubes $A_1$, $A_2$ which are joined by a novel pipe fitting F of the type to be described in full detail hereinafter.

The free end of the pipe $A_2$ is connected with a pressure wave receiver 2, e.g. a pressure-sensitive electric switch, which comprises a contact 2b and a pressure chamber 2a and is operable in response to pressure wave impulses transmitted through the line A. In other words, the pressure wave generator 1 and the line A perform the function of a pushbutton or other manually operable actuating means normally utilized in many electric switches to complete an electric circuit. As shown, the switch 2 comprises a single pressure chamber 2a whose wall may be deformed by a pressure impulse into abutment with the contact 2b to complete the electric circuit of a relay 3 through the conductors a, b, c, g, h. As is well known in the art, the conductors g, h are connected with a source of electrical energy, not shown. In the embodiment of FIG. 1, the switch 2 controls only one relay 3 and the latter in turn controls one or more current-consuming devices, e.g. an electric appliance 4 comprising two light bulbs 4a, 4b. The manner in which the conductors a–h which form part of the electric circuit are connected with each other and with the electric instruments 2–4 is self-explanatory.

Before referring in greater detail to the improved pipe fitting F, I will now describe the conventional pressure wave transmitting systems and the problems which the present invention aims to solve in such systems. Thus, if the arrangement of FIG. 1 is considered only from the point of view of installation, i.e. without going into the details of its operation, it will be readily understood that a serious problem will arise in the laying of pressure wave tubing in a way that the individual lines are readily recognizable for the purpose of inspection and/or repair, and also with a view to save space and to arrange the tubing in such a way that it will not adversely affect the appearance of the entire system. This problem becomes more acute if the system comprises a large number of pressure wave lines, as is indicated in FIG. 1 which shows the aforementioned line A and three additional lines B, C, D each of which may be connected to a separate pressure wave generator and each of which may control one or more receivers in the form of electric switches, relays or the like. Heretofore, the lines of the pressure wave transmitter system were laid in the manner as known in connection with oil pipes or pipes for compressed air which, however, did not insure that the individual lines could be easily distinguished from the other lines. In accordance with the present invention, means is provided for facilitating convenient and time-saving identification of individual lines as well as for arranging the lines in a space-saving and eye-pleasing manner at a point where they may form a sort of switchboard together with the electric devices which they control. As is known, the switches in a plant may be arranged on a panel or a terminal rack constituting a switchboard which is easy to inspect, more flexible than if the switches are arranged at different points of the plant, and safer for the operating personnel. In accordance with the present invention, there is provided for each pressure wave transmitting line of a multi-switch plant a special pipe fitting or joint F which is constructed in such a way that a large number of such fittings may be mounted on a suitable terminal rack, e.g. that same rack on which the pressure sensitive receivers are mounted. Thus, and referring to FIG. 1, the illustrated system may comprise a switchboard or terminal rack for supporting four pipe fittings F which are arranged side by side so that their flat side faces abut each other, four pressure-sensitive switches 2 each of which may be formed with one or more pressure chambers 2a to which the impulses transmitted by the respective pressure wave generators are conveyed, as well as four relays 3, say one for each switch. Of course, the need for my improved arrangement of pressure wave transmitters becomes even more acute if the system comprises a very large number of switches, relays and pipe fittings. According to a feature of my invention which, too, will be more fully explained hereinafter, the pipe fittings F may be arranged in one or more rows, side-by-side as shown in FIG. 1, and may be equipped with means for permitting their connection with or removal from the terminal rack for the switches 2 and/or relays 4 without necessitating the use of any tools for such operation.

Figure 2:
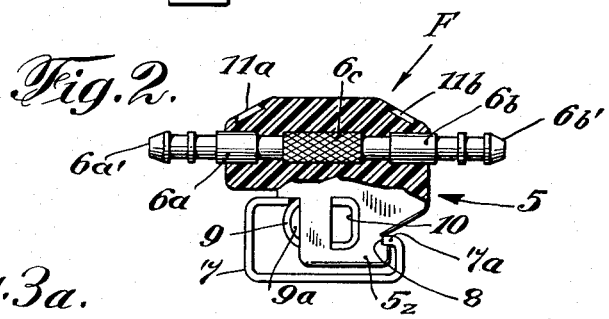
FIG. 2 is a partly elevational and partly sectional view of a pipe fitting embodying one form of my invention, and of a supporting structure therefor.

Referring now to FIG. 2, there is shown a pipe fitting or pipe joint F, also known as tubing connector, which comprises a flattened elongated housing 5 of a suitable insulating material, e.g. a synthetic plastic substance, this housing receiving and sealingly surrounding portions of two oppositely directed nipples 6a, 6b whose adjacent ends are sealingly connected by a flexible tube 6c also embedded in the material of the housing 5. The right-hand transverse end face of the base portion 5z of the elongated housing 5 is formed with a transverse groove 8 which receives one hook-shaped end 7a of an asymmetric supporting rack 7. The other substantially hook-shaped end 7b of the rack 7 engages with a resilient retaining element in the form of a helical spring 9 made of steel wire, this spring being mounted in the housing 5 in such a way that it may recede into the housing when the pipe fitting F is pivoted in clockwise direction about the end 7a of the rack 7 so as to permit withdrawal of the housing from this rack. In order to prevent unauthorized separation of the fitting F from the rack 7, a locking pin 9a may be inserted into the loop or loops formed by the spring 9; this pin 9a also prevents accidental separation of the fitting due to heavy vibration. In FIG. 2, the spring is assumed to have a single convolution a portion of which is anchored in the lower or base portion 5z of the housing 5.

The upper longitudinal end face of the fitting F is formed with two oppositely inclined end portions which, in turn, are formed with suitably configurated, preferably dovetailed transversely extending recesses 11a, 11b adapted to receive designation labels, tags, plates or sheets for identifying the particular line in which the fitting F is inserted, i.e. the line A of FIG. 1. It will be noted that the frustoconical end portions or heads 6a', 6b' of the nipples 6a, 6b project beyond the transverse end faces of the elongated housing 5 so that they may be readily connected with the ends of the pipes $A_1$, $A_2$, respectively. Of course, it will be readily understood that the nipples 6a, 6b may form part of a one-piece connecting means which is embedded in the insulating material of the housing 5.

Figure 3A:
FIG. 3a is an end view of the modified pipe fitting.
Figure 3A:
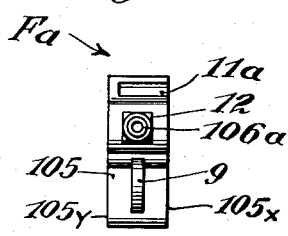
Figure 3:
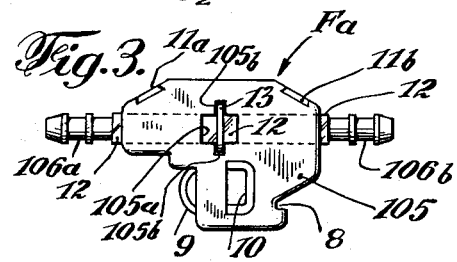
FIG. 3 is a side elevational view of a modified pipe fitting.

Alternately, and as shown in FIG. 3, the one-piece connecting means 12 in the form of a tube of rectangular contour is inserted into a complementary bore formed in the body or housing 105 of the modified pipe fitting Fa. This tube 12 may be retained or anchored in the housing 105 by a split ring- or U-shaped retaining member 13 which is insertable through a transverse cutout 105a of the housing, this cutout having upwardly and downwardly projecting extensions 105b adapted to receive portions of the member 13 so that the tube 12 is held against axial displacements in the housing 105. It will be readily understood that the portion of the tube 12 passing through the cutout 105a is formed with suitable peripheral notches into which the inner edge portions of the retaining member 13 extend. The outwardly extending ends of the tube 12 sealingly receive or are integral with two nipples 106a, 106b, otherwise, the construction of the pipe fitting Fa is the same as that of the fitting F shown in FIG. 2. FIG. 3a shows that the housing 105 is flat, i.e. it is formed with two parallel side faces 105x, 105y, and that the dovetailed recesses 11a, 11b need not extend throughout the full width of the housing. The recesses and the side faces of the pipe fitting F are of identical configuration.

Figure 4A:
FIG. 4a is an end view of the fitting shown in FIG. 4.
Figure 4A:
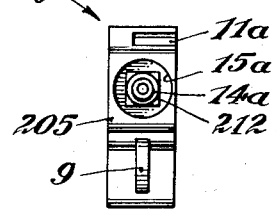
Figure 4:
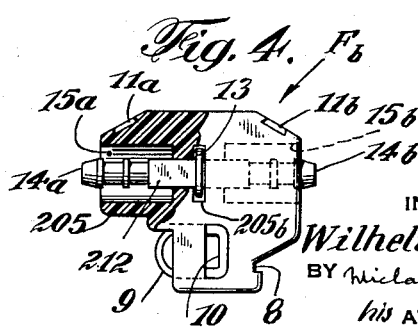
FIG. 4 is a partly elevational and partly sectional view of a different fitting whose nipples are partly concealed in the body.

FIGS. 4 and 4a illustrate a pipe fitting or joint Fb which is similar to the fitting Fa excepting that the nipples 14a, 14b of the tube 212 are nearly completely received in two preferably cylindrical cavities 15a, 15b provided in opposite lateral end faces of the body or housing 205. In addition, the comparatively large transverse cutout 105a is replaced by a much narrower cutout 205b which is just large enough to accommodate the U- or ring-shaped preferably resilient retaining member 13 utilized to prevent axial displacements of the tube 212 in the housing 205. The fitting Fb protects the ends of the pipes connected with the nipples 14a, 14b and, moreover, the overall length of the fitting is reduced to a minimum. It will be noted that, despite the provision of cavities 15a, 15b, the width of the fitting Fb exceeds only slightly the width of the fitting F or Fa.

Referring now to FIG. 5, the pipe fitting Fc comprises a housing 305 which is integral with two nipples 17a, 17b and which defines a through passage 16 extending coaxially through the aligned nipples. Otherwise, the construction of the pipe fitting Fc is the same as that of the fitting F shown in FIG. 2. The advantage of the fitting Fc is that it may be produced at a very low cost. It will be noted that each of the pipe fittings F–Fc is formed in the base portion of its respective housing with a through channel or opening 10 which may serve as a means for receiving a suitably configured stacking holder or pin prior to the mounting of the fittings on the rack 7.

The pipe fitting Fd of FIG. 6 may be of a construction which is identical with the construction of the fitting F, Fa or Fb, and additionally comprises a regulating means in the form of a valve 18 which may be manually adjusted by a handgrip member 18a located adjacent to the upper longitudinal end face of the fitting Fd. This valve 18 may assume the form of a simple stopcock, a butterfly valve or the like, and is utilized for interrupting or establishing the pressure wave connection without requiring a separation of the tubing from the nipples 406a, 406b. The handgrip member 18a is provided with a suitable pointer which indicates the position of the valve 18.

FIG. 7 illustrates a further modification of my invention according to which the pipe fitting Fe comprises three nipples 506a, 506b, 506c. This fitting also comprises a three-way valve 19 including a handgrip member 19a and a pointer 19b. In the position of the pointer 19b as shown in the drawing, the numeral "0" applied to the upper longitudinal end face of the housing 505 indicates that the nipple 506b is sealed from the nipples 506a and 506c. When the pointer 19b is directed toward the numeral "1" or "2," it indicates that the nipple 506b respectively communicates with the nipple 506a or 506c and, when directed toward the inscription "1–2," the pointer 19b indicates that the nipple 506b is in communication with the nipples 506a and 506c. In other words, the pipe fitting Fe may be utilized for changing the direction of the pressure wave from one generator to a plurality of pressure wave receivers or for sending pressure wave impulses from two generators to a single receiver, as well as for alternately sending an impulse from one generator to two different receivers. Of course, it will be readily understood that the pipe fitting Fe may be modified still further by connecting or integrally forming its housing 505 with four nipples and by providing therein a four-way valve so that the modified fitting can be utilized at the junction of pipes leading to two different generators and to two different receivers, to one generator and three receivers, or to one receiver and three generators.

It will be noted that the nipples of the pipe fittings shown in FIGS. 2 to 7 are formed with smooth pipe receiving end portions or heads which are preferably of a frustoconical shape. According to a further modification of my invention which is shown in FIGS. 8 to 10, an absolutely leakproof seal between the end of a conduit or pipe 22 and the nipple 20 of a pipe fitting Ff may be obtained if the nipple 20 is formed with external threads 25 which are spaced from the head 21 by a short cylindrical neck portion 27 and which are adapted to mesh with internal threads of a screw cap 24 whose bottom wall is formed with a bore 26 for the pipe 22. The frustoconical end portion or head 21 of the nipple 20 is received in the end portion of the pipe 22 which is assumed to consist of at least slightly elastic synthetic plastic material. As best shown in FIG. 10, the cap 24 loosely receives or is coaxially connected with a cylindrical sleeve or collar 23 which is formed with an outwardly flaring conical bore 23a whose conicity is preferably the same as that of the head 21. Thus, when the cap 24 is screwed onto the threaded portion 25 of the nipple 20, the sleeve 23 will compress the end portion of the pipe 22 against the outer side of the head 21 and will insure a leakproof joint between the nipple and the pipe. If the sleeve 23 is a separate part, the end of the pipe 22 is led through the bore 26 of the cap 24 in the first step, the end of the pipe is then led through the outwardly diverging bore 23a of the sleeve 23 in the next step, the end of the pipe is forced onto the head 21 in a third step, and the cap 24 is screwed onto the threaded portion 25 of the nipple 20 in a final step. Alternately, if the sleeve 23 is integral with the cap 24, the end of the pipe 22 may be simultaneously passed through the bores 26 and 23a prior to connection with the head 21.

According to FIG. 11, the nipple 20 is the same as that shown in FIGS. 8–10 but the modified screw cap 24' operates without a distinct sleeve 23 because it is formed in such a way that its pipe-receiving coaxial cylindrical bore 26' communicates directly with an outwardly flaring conical bore 23a' whose wall engages and sealingly retains the end portion of the pipe 22 on the frustoconical head 21.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the appended claims.

What is claimed as new and desired to be secured by Letters Patent is:

1. In a pressure wave transmitting system, in combination, a supporting rack; a plurality of composite pressure wave transmitting lines each comprising at least two pipes; and a pipe fitting for each of said lines, each fitting comprising a housing formed with a pair of substantially parallel unobstructed side faces each adapted to abut a side face on an adjacent housing, at least two communicating nipples on the housing, each connectable with a pipe of the respective line, and attachment means on the housing for retaining the same on said rack in such manner that said fittings are arranged side-by-side with their respective side faces abutting each other and each of said fittings is individually removable from said supporting rack while the other fittings are retained thereon and without affecting the strength of the support of said other fittings.

2. In a pressure wave transmitting system, in combination, a line comprising a first and a second pipe; a supporting rack having a first end portion and a substantially hook-shaped second end portion; and a pipe fitting comprising a housing formed with two parallel unobstructed side faces each adapted to abut a side face on a similar adjacent housing, said housing including a base portion having a first and a second transverse end face, one of said transverse end faces formed with a transverse groove for said first hook-shaped end portion, a retaining spring projecting from the other transverse end face and releasably engaging with said second hook-shaped portion for mounting said housing on said rack, and at least two nipples on said housing, said nipples communicating with each other and each connected with one of said pipes for permitting the transmission of pressure waves through said line.

3. In a pressure wave transmitting system, in combination, a supporting rack; a plurality of composite pressure wave transmitting lines each comprising at least two pipes; and a pipe fitting for each of said lines, each fitting comprising a housing formed with a pair of substantially parallel unobstructed side faces each adapted to abut a side face on an adjacent housing, at least two communicating nipples on the housing, each connectable with a pipe of the respective line, and means on the housing for retaining the same on said rack in such manner that said fittings are arranged side-by-side and that their respective parallel unobstructed side faces abut each other, said retaining means comprising a helical spring mounted on said housing and releasably engaging with said rack, and a separate locking pin for each of said fittings cooperating with said spring for preventing unintentional separation of the respective fitting from said rack.

4. In a pressure wave transmitting system, in combination, a supporting rack; a plurality of composite pressure wave transmitting lines each comprising at least two pipes; and a pipe fitting for each of said lines, each fitting comprising a housing, at least two communicating nipples on the housing, each of said nipples being connectable with one of said pipes of the respective line, and resilient attachment means on the housing for releasably retaining the latter on said rack in a manner such that each of said fittings is individually removable from said supporting rack while the other fittings are retained thereon and without affecting the strength of the support of said other fittings.

5. In a pressure wave transmitting system, in combination, a supporting rack; a plurality of composite pressure wave transmitting lines each comprising at least two pipes; and a pipe fitting for each of said lines, each fitting comprising a one piece housing having a through bore and formed with a pair of unobstructed side faces substantially parallel to each other and to the axis of the through bore and each such side face being adapted to abut a side face on an adjacent housing, at least two nipples on the housing, one at each end of and communicating with the through bore, each of said nipples being connectable with a pipe of the respective line, and attachment means on the housing for retaining the same on said rack in such a manner that said fittings are arranged side by side with their respective side faces abutting each other, each of said fittings being adapted to be individually removable from said supporting rack while the other fittings are retained thereon without affecting the strength of the support of said other fittings.

6. In a pressure wave transmitting system as set forth in claim 5, wherein said housing further comprises an edge portion arranged to receive identifying indicia.

References Cited by the Examiner

UNITED STATES PATENTS

| 225,749 | 3/80 | Eberman | 137—625.47 |
| 426,655 | 4/90 | Bennett | 248—68 |
| 570,167 | 10/96 | Greenfield | 285—389 |
| 738,115 | 9/03 | Lincoln | 137—625.47 |
| 1,021,634 | 3/12 | Schroeder | 248—24 |
| 1,133,976 | 3/15 | Kraus | 248—68 |
| 1,877,502 | 9/32 | Flocco | 60—62.5 X |
| 1,984,592 | 12/34 | MacLean | 251—367 |
| 2,417,260 | 3/47 | Morehouse | 248—68 |
| 2,615,954 | 10/52 | Mungovan et al. | 285—47 |
| 2,648,199 | 8/53 | Alderson | 60—62.5 |
| 2,699,915 | 1/55 | Goepfrich | 285—403 |
| 2,746,110 | 5/56 | Bedford | 248—68 |
| 2,828,937 | 4/58 | Kreitchman | 251—367 |
| 2,859,984 | 11/58 | Thomas | 285—158 |
| 3,112,127 | 11/63 | Campbell | 285—158 |

FOREIGN PATENTS

| 645,043 | 6/28 | France. |
| 611,051 | 10/48 | Great Britain. |

JULIUS E. WEST, *Primary Examiner.*

CARL. W. TORNLIN, ROBERT R. BUNEVICH,
*Examiners.*